(No Model.)
C. F. PARKER.
MECHANISM FOR THE MANUFACTURE OF RUBBER BOOTS.
No. 360,242. Patented Mar. 29, 1887.
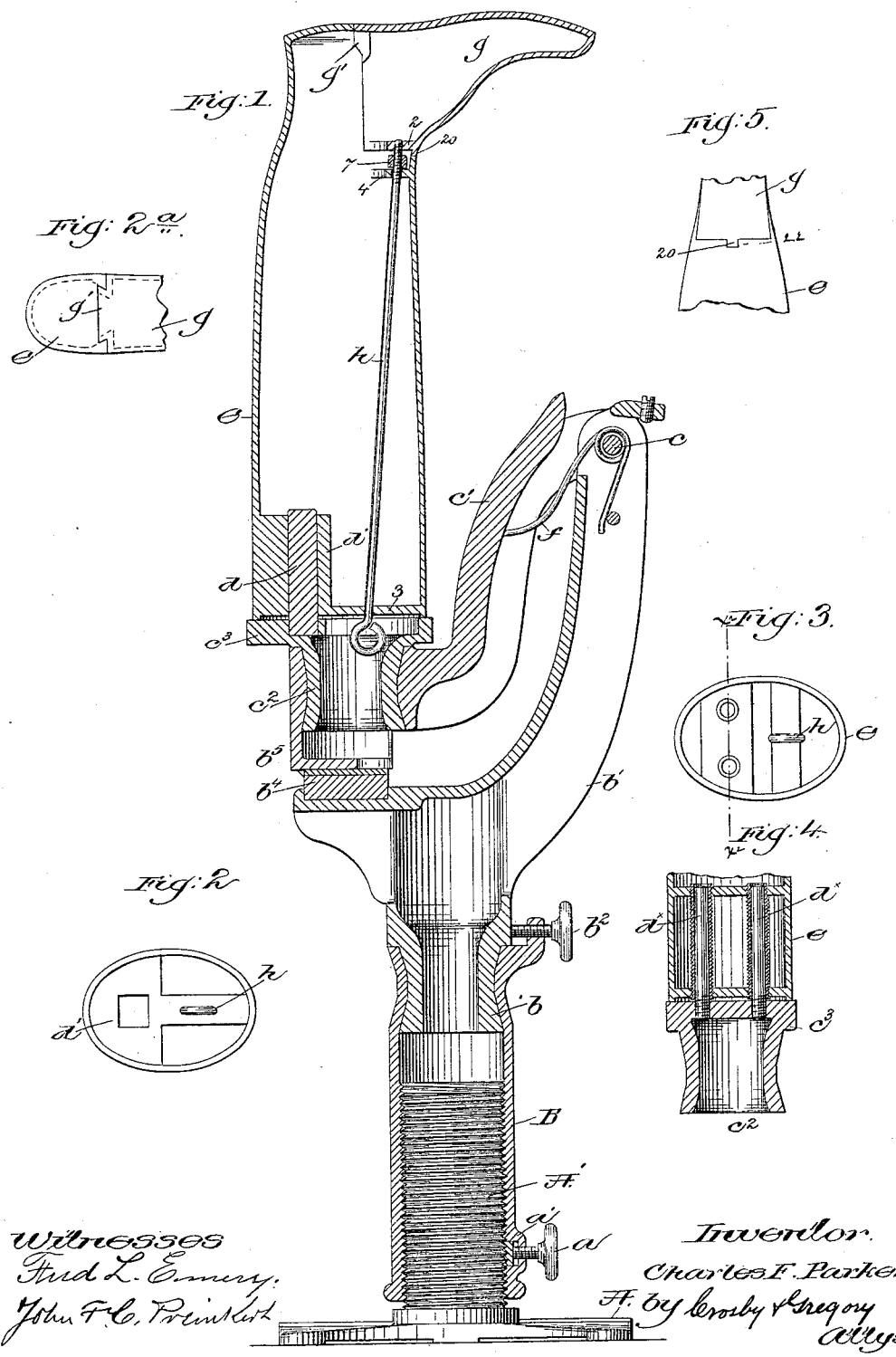

United States Patent Office.

CHARLES F. PARKER, OF WOLLASTON, MASSACHUSETTS, ASSIGNOR TO THE SOLIDITY IRON LAST COMPANY, OF NEW YORK, N. Y.

MECHANISM FOR THE MANUFACTURE OF RUBBER BOOTS.

SPECIFICATION forming part of Letters Patent No. 360,242, dated March 29, 1887.

Application filed December 21, 1886. Serial No. 222,173. (No model.)

*To all whom it may concern:*

Be it known that I, CHARLES F. PARKER, of Wollaston, county of Norfolk, and State of Massachusetts, have invented an Improvement in Mechanism for the Manufacture of India-Rubber Boots, of which the following description, in connection with the accompanying drawings, is a specification, like letters on the drawings representing like parts.

This invention has for its object to provide a novel jack and tree upon which to manufacture india-rubber boots. As now practiced, the layers of material for the leg and foot are applied by the workman to a wooden tree, the workman placing the tree on a table or bench before him, and changing its position frequently to enable him to apply the layers of material to the tree, rub and fit them closely together and to the tree, and to last the material over the bottom of the tree for the application of a sole.

To facilitate the manufacture of india-rubber boots, I have provided a hollow metal tree, the leg having a detachable foot, which is secured very firmly to it, so as to avoid any accidental twisting of the foot on the leg. This foot is held to the leg by a screw-rod extended through the leg and suitable guides forming a part of it, one guide being located near that part of the shoulder of the leg against which the last is drawn, the withdrawal of the screw-rod being prevented by means of a nut or shoulder upon it. The end of the leg is provided with a socket, which receives a stud or projection erected upon a swivel-block, which turns freely in a socket of an arm pivoted upon a bracket, which in turn is provided with a shank, which may turn in a vertically-adjustable sleeve fitted to a foot-piece adapted to rest on the floor.

The particular features of my improved jack will be hereinafter described, and pointed out in the claims at the end of this specification.

Figure 1, in vertical section, shows a jack embodying my invention; Fig. 2, an end view of the leg of the tree detached; Fig. 2$^a$, a detail to be referred to, showing part of the bottom of the tree. Figs. 3 and 4 are views of a modification of my invention, illustrating the employment of two posts instead of one, or the connecting means between the tree and the swivel-block on which it is held; and Fig. 5 is a sectional detail to the left of the line $x^3$.

The foot or base A has erected on it a post, A', herein shown as threaded, and upon which is fitted a sleeve, B, also shown as threaded, rotation of the sleeve on the post adjusting the jack and tree vertically. The sleeve may be located or held in adjusted position by a locking device, herein shown as a set-screw, $a$, it acting upon a threaded dog, $a'$. The upper end of the sleeve A' receives in it the shank $b$ of a bracket, $b'$, the said shank being rotatable in the sleeve when the set-screw $b^2$ is loosened. The bracket $b'$ has pivoted to it by bolt $c$ the upper end of an arm, $c'$, provided with a hole or opening for the reception of a swivel-block, $c^2 c^3$, the same constituting a turn-table, it having erected upon it a suitable stud, $d$, entering a socket, $d'$, forming, preferably, an integral part of the leg $e$ of the tree, the said leg being made hollow and of metal, and in one piece.

The function of the stud and socket is to hold the tree firmly on the turn-table and prevent it from rotating thereon independently of the turn-table.

The stud in Figs. 1 and 2 is shown as rectangular in cross-section; but as a modification of the connection between the leg and turn-table I may use two studs, as $d^\times d^\times$, made to enter two sockets (see Figs. 3 and 4) of the leg $e$. The bracket $b'$ has a pad or cushion, $b^4$, preferably of leather, and the arm $c'$ has a foot, $b^5$, which meets the cushion when the bracket is in the position shown in Fig. 1.

The spring $f$ is so applied as to aid in keeping the leg in horizontal position when the same is turned up about the pivot $c$, the spring counterbalancing, or nearly so, the weight of the turn-table and leg, wherein they exceed the weight of the foot or that part of the foot and leg which extends beyond the bracket $b'$ when the tree is horizontal. The foot $g$, also made hollow, has a dovetailed lug, $g'$, that enters a dovetailed slot (see Fig. 2$^a$) in the heel part of the leg $e$.

The foot has an ear, 20, that enters a notch, 22, in the front of the leg, (see Fig. 5,) and a projection, 2, of the foot is screw-threaded to receive in it the threaded end of a binding-rod, $h$, which is extended through the end piece, 3, of the leg, and through a guide, 4, forming part of the leg, a nut, 7, screwed upon the said rod a little distance from its threaded end, preventing the rod from being withdrawn from the tree.

Herein it will be noticed that the hollow cast-metal leg is attached to a swivel-block or turn-table, which is free to be rotated on an arm or support, as $c'$, the swivel-block or turn-table or leg being rotated about the longitudinal center line of the leg.

I do not broadly claim a boot-tree secured to the periphery of a turn-table adapted to rotate about an axis at right angles to the center of the leg of the tree.

I claim—

1. The swivel-block or turn-table and the hollow cast-metal leg attached to it, combined with an arm or support to receive the said swivel-block loosely, the latter being free to rotate in said arm or support about the longitudinal center of the said leg, as and for the purpose set forth.

2. The hollow metallic leg having a dovetailed groove and a notch, 22, combined with the hollow foot having a dovetailed lug and a projection, 20, substantially as described.

3. The hollow metal leg having a guide fixed to it, and the rod $h$, extended through it and provided with a screw-thread, combined with the foot having a screw-threaded portion, 2, to be entered by the said rod, substantially as described.

4. The hollow metal leg provided with a socket, combined with the swivel-block or turn-table provided with a stud to enter the said socket, and with an arm upon which the said hub is mounted, substantially as described.

5. The foot provided with a screw-threaded post and the sleeve mounted thereon, combined with the bracket $b'$, the arm $c'$, mounted thereon, and the leg and foot carried by the said arm, substantially as described.

6. The bracket $b'$, the arm $c'$, pivoted thereon, and the leg and foot carried by the arm, combined with a spring, as $f$, to aid in keeping the leg in horizontal position, substantially as described.

7. The one-piece hollow metal leg, combined with a swivel-block or turn-table upon the top of which the said leg is mounted, the leg and turn-table being free to be rotated in unison about the longitudinal center of the leg of the tree, all substantially as described.

8. A tree and a turn-table on which it is mounted, combined with a pivoted arm or support on or with relation to which the said turn-table is free to rotate, whereby the tree is capable of being used both in a horizontal and vertical position, as and for the purposes set forth.

In testimony whereof I have signed my name to this specification in the presence of two subscribing witnesses.

CHAS. F. PARKER.

Witnesses:
G. W. GREGORY,
F. L. EMERY.